United States Patent
Sur et al.

(10) Patent No.: US 6,748,580 B1
(45) Date of Patent: Jun. 8, 2004

(54) METHOD AND APPARATUS FOR CREATING SOFTWARE TOOLS USING A JTML INTERFACE

(75) Inventors: Robert K. Sur, Austin, TX (US); Jeffrey K. Price, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,874

(22) Filed: Apr. 22, 1999

(51) Int. Cl.[7] .................. G06F 9/44; G06F 15/00; G06F 9/00
(52) U.S. Cl. ............. 717/105; 717/109; 717/113; 715/513; 719/328
(58) Field of Search ................ 717/1, 2, 3, 7, 717/10, 100, 106, 120, 146, 162, 105; 345/760, 762; 707/513; 713/167; 714/36; 715/513; 719/328

(56) References Cited

U.S. PATENT DOCUMENTS

| | | | | |
|---|---|---|---|---|
| 5,313,614 A | * | 5/1994 | Goettelmann et al. | 717/138 |
| 5,421,006 A | | 5/1995 | Jablon et al. | 714/36 |
| 5,692,047 A | | 11/1997 | McManis | 713/167 |
| 5,883,639 A | * | 3/1999 | Walton et al. | 345/473 |
| 6,011,916 A | * | 1/2000 | Moore et al. | 717/104 |
| 6,026,233 A | * | 2/2000 | Shulman et al. | 717/113 |
| 6,044,218 A | * | 3/2000 | Faustini | 717/107 |
| 6,083,279 A | * | 7/2000 | Cuomo et al. | 717/118 |
| 6,233,726 B1 | * | 5/2001 | Bowman et al. | 717/107 |
| 6,240,450 B1 | * | 5/2001 | Sharples et al. | 709/224 |
| 6,292,925 B1 | * | 9/2001 | Dellinger et al. | 716/8 |
| 6,292,936 B1 | * | 9/2001 | Wang | 717/115 |
| 6,470,349 B1 | * | 10/2002 | Heninger et al. | 707/102 |
| 6,535,896 B2 | * | 3/2003 | Britton et al. | 715/523 |

OTHER PUBLICATIONS

Lubell–Phillips, SGML Application Development: Tradeoffs and Choices, Nov. 1996, Proceedings of the SGML'96, Boston, MA.*

Johnson, Tcl and Java Integration, Feb. 3, 1998, Sun Microsystems Laboratories.*

Lieberman, Integrating User Interface Agents with Conventional Applications, Jan. 1998, Proceedings of the ACM Conference on Intelligent User Interfaces, San Francisco.*

Sauder–Lubell, The Express Web Server: A User Interface for Standards Development, Jan. 1998, ACM.*

Owen et al., ASML: Automatic Site Markup Language 1.03, Feb. 1997, Dartmouth Experimental Visualization Laboratory.*

Wang, Using XML for process Modelling, Mar. 1999, Department of Computer and Information Science, Norwegian University of Science and Technology, Norway.*

* cited by examiner

*Primary Examiner*—Anthony Nguyen-Ba
(74) *Attorney, Agent, or Firm*—Duke W. Yee; David A. Mims, Jr.; Cathrine K. Kinslow

(57) ABSTRACT

A user creates a software tool using a simple Java text markup language (JTML) interface. The user provides the JTML server with JTML pseudo code (code objects) which the JTML server recognizes, and performs routine programming tasks associated with the JTML code objects. The JTML server builds the executable JTML tool by invoking Java classes, associated with the code object, which are necessary to create the tool. The Java classes also create the user interface necessary for the user to enter data and commands for executing the JTML tool once the tool has been created. The JTML server acts as a secure port to the host by insulating the host contact or connection from a client. No code or command passes directly between the host and the client, instead the JTML server mediates all transactions between the two. Additional security is provided by the JTML server logging each user's access and each user's transaction. A record is therefore created from all user interaction between the client and the JTML server for review.

27 Claims, 9 Drawing Sheets

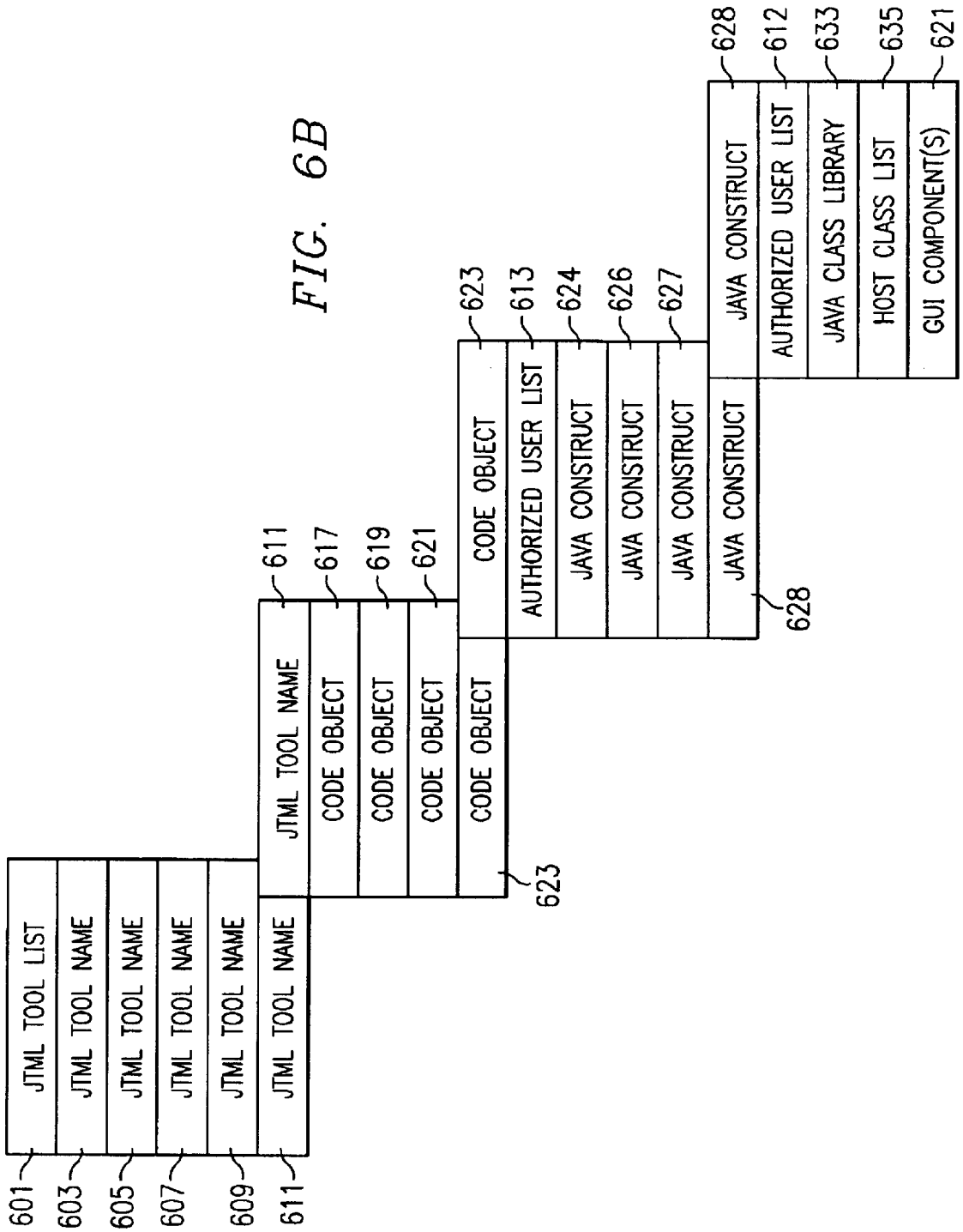

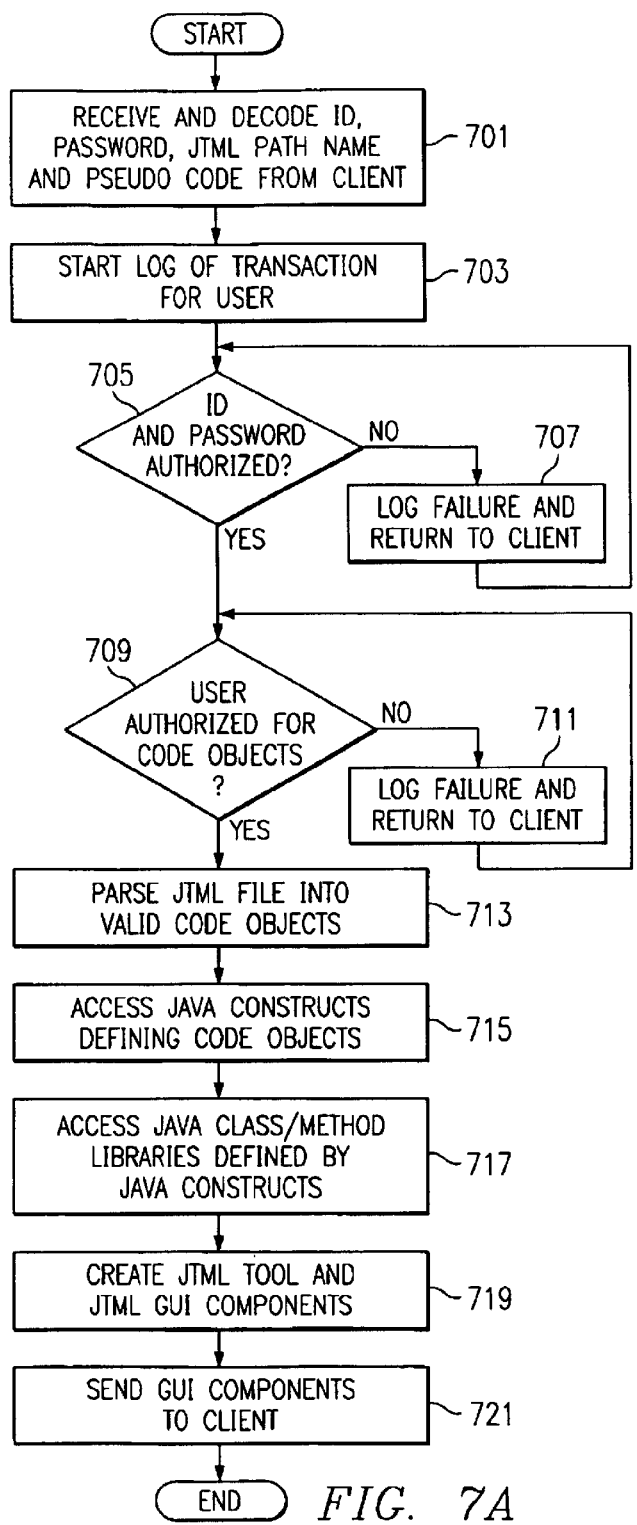

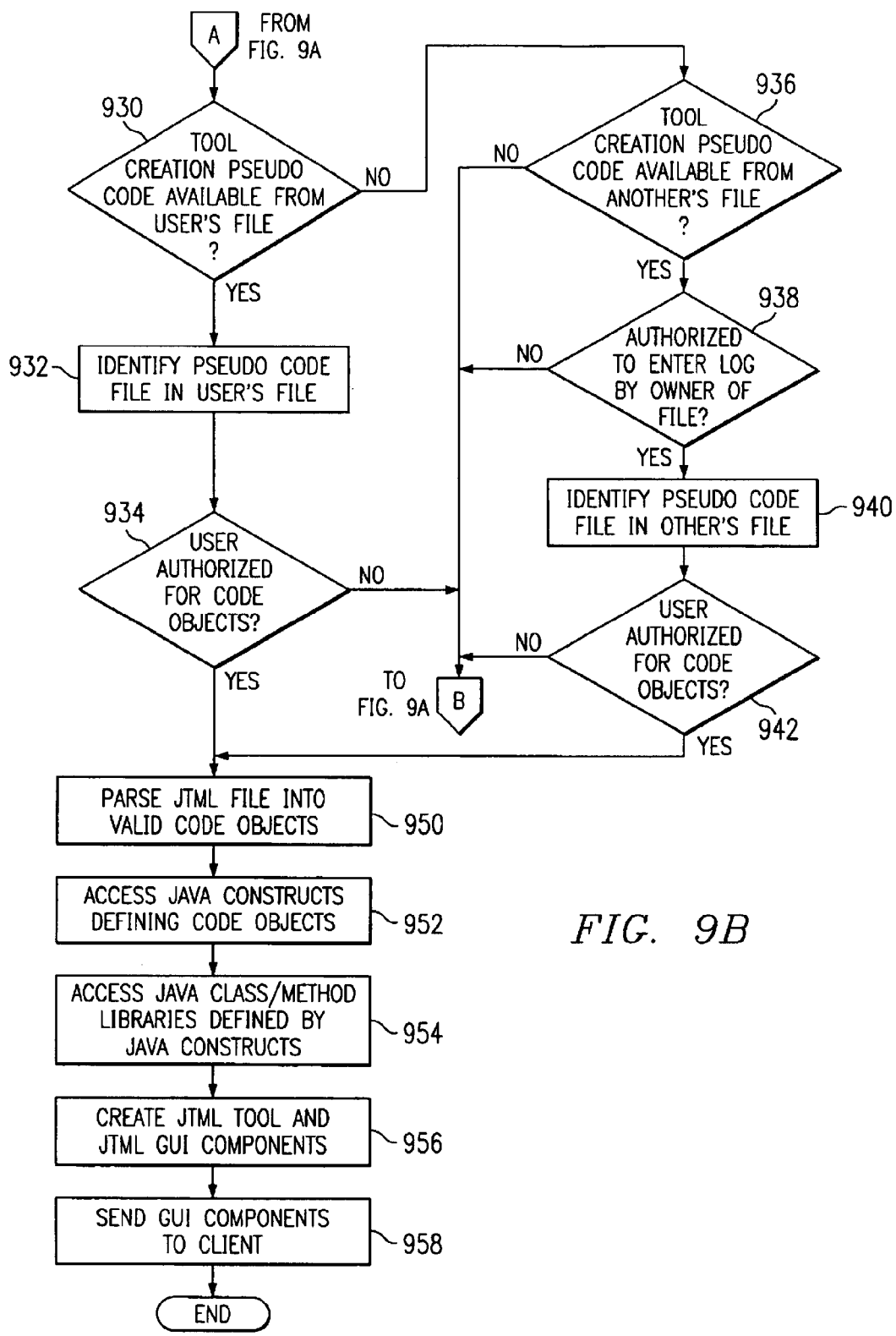

METHOD AND APPARATUS FOR CREATING SOFTWARE TOOLS USING A JTML INTERFACE

BACKGROUND OF THE INVENTION

1. Technical Field

The present invention relates to the field of administrative servicing of a system or network. Still more particularly, the present invention relates to a method and apparatus for rapidly creating and deploying software tools for system and network administrators.

2. Description of Related Art

Network administrators perform network related functions primarily for network maintenance, user account maintenance, and product performance and compatibility. Occasionally, a network administrator may need a new software tool for solving a problem related to servicing the network. Rarely is a network administrator well enough versed in software programming to be able to create working tools.

Creating a software tool for use on a system or network requires the network administrator to clearly define the problem, which requires tool development, and then to formulate a set of expectations for tool performance. Performance standards and goals for a completed tool are also considered. The administrator communicates this information to a network programmer or to a programmer who is at least familiar with the network platform on which the tool is to be executed.

However, programmers are rarely assigned to such tasks immediately upon request; therefore, during the usual delay, administrators may become more focused on the needs or develop a better understanding of the problem, enabling the administrator to redefine tool needs. The programmer takes this information and attempts to develop a tool that meets the needs of the administrator. A prototype tool is usually developed, and its performance is evaluated by the network administrator. Because the programmer is usually not completely familiar with the network environment, and the administrator is unfamiliar with programming, the first prototype may be substantially different from what is needed by the network administrator. During prototype development, the administrator and the administrator's staff usually work closely with the programmer, evaluating and updating the requirements for the tool. It is not unusual for the tool to be prototyped several times before a working version is released.

Upon release, the tool's performance is susceptible to undiscovered bugs. At this point, the programmer's job is essentially completed; yet, the administrator may feel the tool's performance does not meet the initial expectations voiced in requesting a tool. Many times the process begins anew with a request for development of a new version of the tool in order to solve undiscovered problems with the initial tool and incorporate new features not considered until after the initial tool was requested.

The above described process requires an inordinate amount of time for tool development, often when the tool needed is relatively simple to program.

Additionally, the above described process is inflexible and requires a great deal of interface between the network administrator and the programmer. The amount of time needed to interface with a programmer reduces the amount of time the administrator has to devote to administration of the network.

Still further, software tool development requires a level of programming skills greater than that of an administrator.

Moreover, once the tool is developed, debugging and tool modification are outside the scope of the average network or system administrator so a programmer is again needed to perform these aspects of tool development.

SUMMARY OF THE INVENTION

The present invention provides a method and apparatus for developing a software tool. A user creates a software tool using a simple Java text markup language (JTML) interface. The user provides the JTML server with JTML pseudo code (code objects) recognized by the JTML server to perform routine programming tasks associated with the JTML code objects. The JTML server builds the executable JTML tool by invoking Java classes associated with the code object, which are necessary to create the tool. The Java classes also create the user interface necessary for the user to enter data and commands for executing the JTML tool after the tool has been created.

The JTML server acts as a secure port to the host by insulating the host from contact or connection from a client. No code or command passes directly between the host and the client. Instead, the JTML server mediates all transactions between the two. The JTML server provides additional security by logging each user's access and each user transaction. A record is thus created from all user interaction between the client and the JTML server for review.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6B illustrates a linked list as might be resident in JTML tool database 507;

FIG. 7A illustrates a process of the present invention;

FIG. 7B illustrates a process executing a tool which may be created by a JTML server;

FIGS. 9A and 9B illustrate a more detailed view of a process of the present invention as seen from the JTML server.

DETAILED DESCRIPTION OF THE PREFERRED EMBODIMENT

Figure 1:
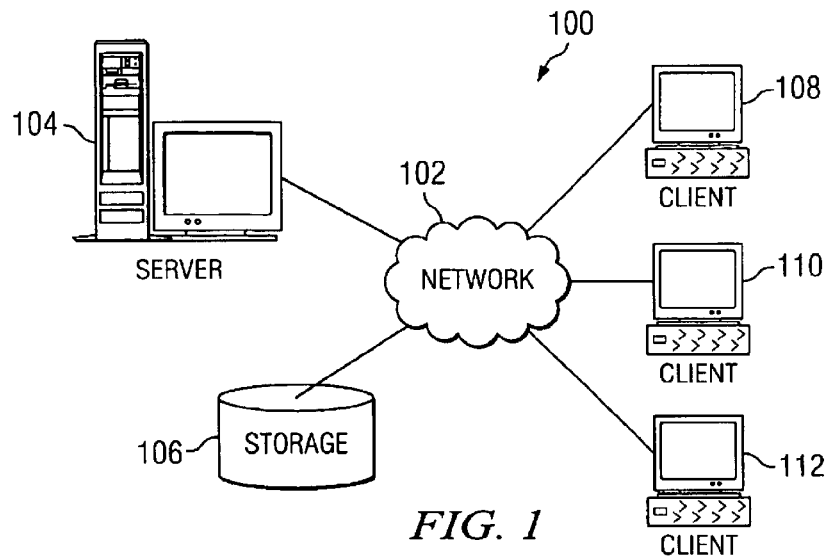
FIG. 1 depicts a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network which receives a program or other application from another computer coupled to the network. In the depicted example, server 104 provides data, such as boot files, operating system images, and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Alternatively, client 110 may print to printer 116 or printer 118 depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as an intranet or a local area network.

FIG. 1 is intended as an example and not as an architectural limitation for the processes of the present invention.

Figure 2:
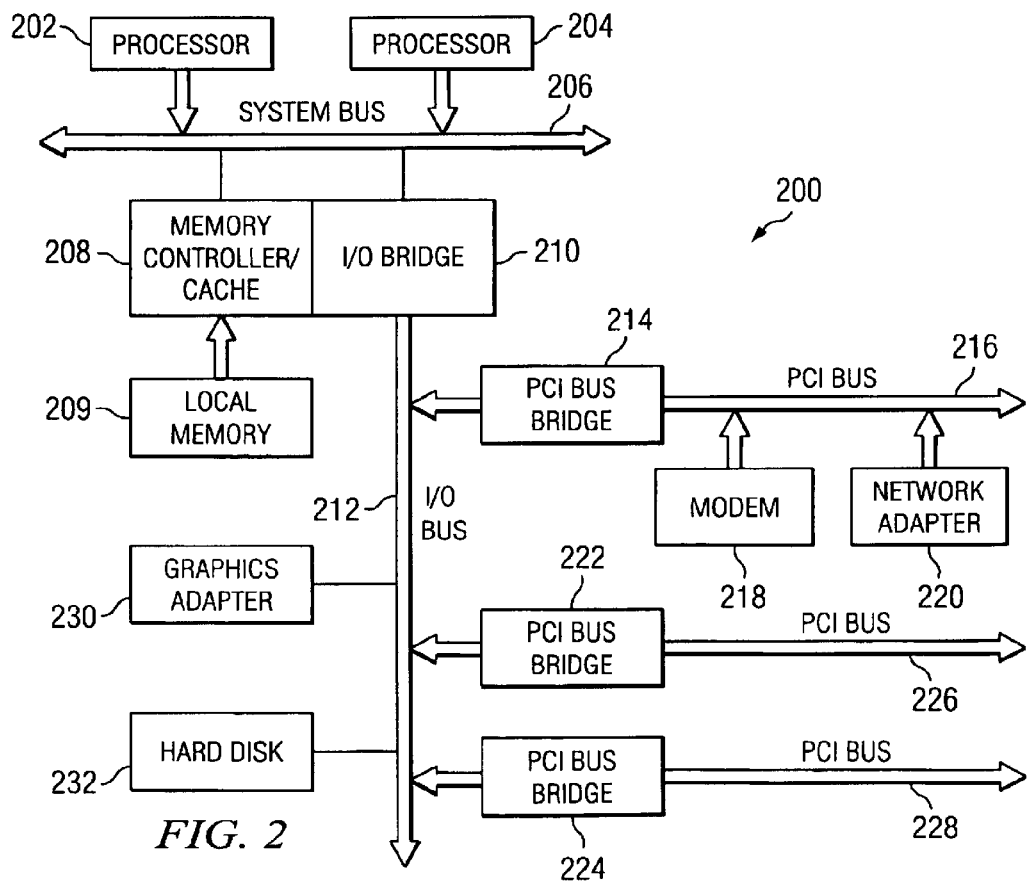
FIG. 2 illustrates a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Modem 218 and network adapter 220 may be connected to PCI bus 216. Typical PCI bus implementations support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used, in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
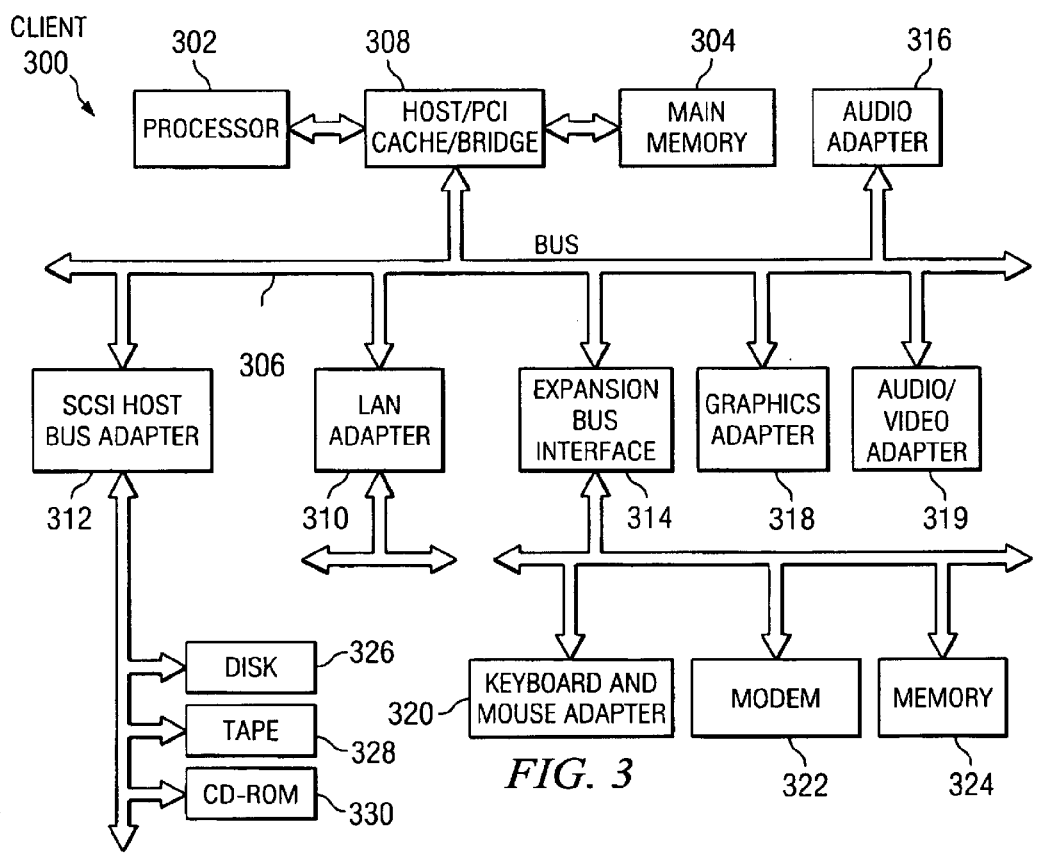
FIG. 3 illustrates a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations support three or four PCI expansion slots or add-in connectors.

In the present example, an operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system such as Java may run in conjunction with the operating system and provides calls to the operating system from Java™ programs or applications executing on data processing system 300. Java Text Markup Language (JTML) is an HTML-like language which enables users to use Java with the ease of using HTML for creating web pages. JTML is an integrated package of tools for the development of Java applets and user interfaces. It allows almost anyone with a need for online communication to create state-of-the-art applets without understanding Java programming concepts. JTML allows administrators to set up personal user accounts for authorizing users and to set up routines for automatically recording transactions between a JTML server and individual users. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The present invention provides a method and apparatus for developing a software tool. A user creates a software tool using a simple JTML language interface. The user provides the JTML server with JTML pseudo code (code objects) which the JTML server recognizes to perform routine programming tasks associated with the JTML code objects. The JTML server builds the executable JTML tool by invoking Java classes associated with the code object, which are necessary to create the tool. The Java classes also create the user interface necessary for the user to enter data and commands for executing the JTML tool after the tool has been created. The JTML server acts as a secure port to the host by insulating the host contact or connection from a client. No code or command passes directly between the host and the client; rather, the JTML server mediates all transactions between the two. Additional security is provided by the JTML sever, which logs each user's access and each user transaction. A record is thus created from all user interaction between the client and the JTML server for review.

Figure 4:
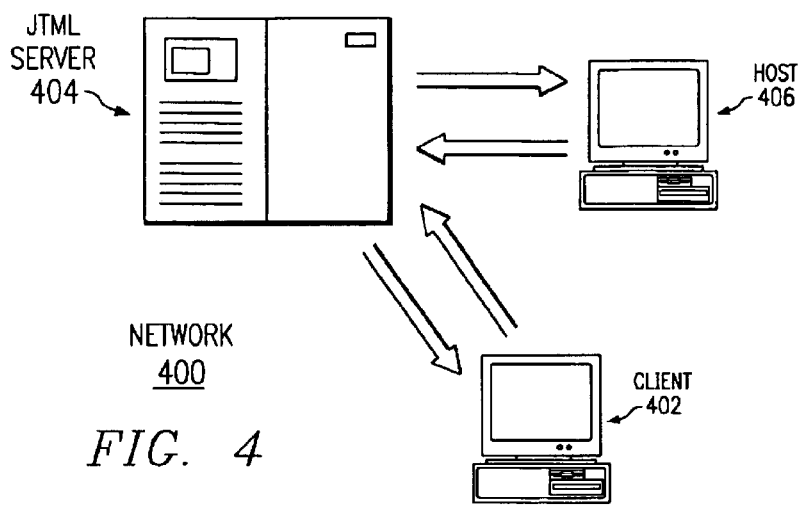
FIG. 4 illustrates a network configuration utilized by a preferred embodiment of the present invention.

FIG. 4 illustrates a network configuration utilized by a preferred embodiment of the present invention. Network 400 consists of client computer 402, host computer 406, and JTML server 404. Host computer 406 may represent a plurality of host computers, and client computer 402 may represent a plurality of client computers. An important advantage of the network configuration utilized by the present invention is that client computer 402 is completely isolated from host computer 406 by means of a JTML server. Therefore, in order for any client to access a host on network 400, that client must be authorized through the security in place in the JTML server.

In one aspect of the present invention, a user at client 402 can access host 406 or execute commands at host 406 through JTML server 404 by means of the creation of JTML tools within the JTML server. A user need not be versed in all aspects of the program language needed for creating tools on host 406 because the user interacts only with the JTML server.

In a preferred embodiment of the present invention, the user request consists of the user ID, user password, and a JTML file or a pathname for a JTML tool file. The JTML server accesses the file, either directly from the user request or through the pathname, and parses the JTML file into recognizable code objects. The use of Java constructs defined by individual code objects invokes a limited number of Java classes/methods for creating a GUI, which is sent to the user. Simultaneously, the JTML server logs the transactions between the user and the JTML server. The JTML tool is then available for immediate use by the user or may be named and stored in a JTML tool database for subsequent use.

Another aspect of the present invention is the use of a markup language, such as JTML, which is platform-independent, allows a user to interface with a server without regard to the server's platform. Again, the user need not possess advanced programming skills because JTML uses uncomplicated syntax, similar to HTML, which is common to other markup languages and requires little formal programming skills.

Figure 5:
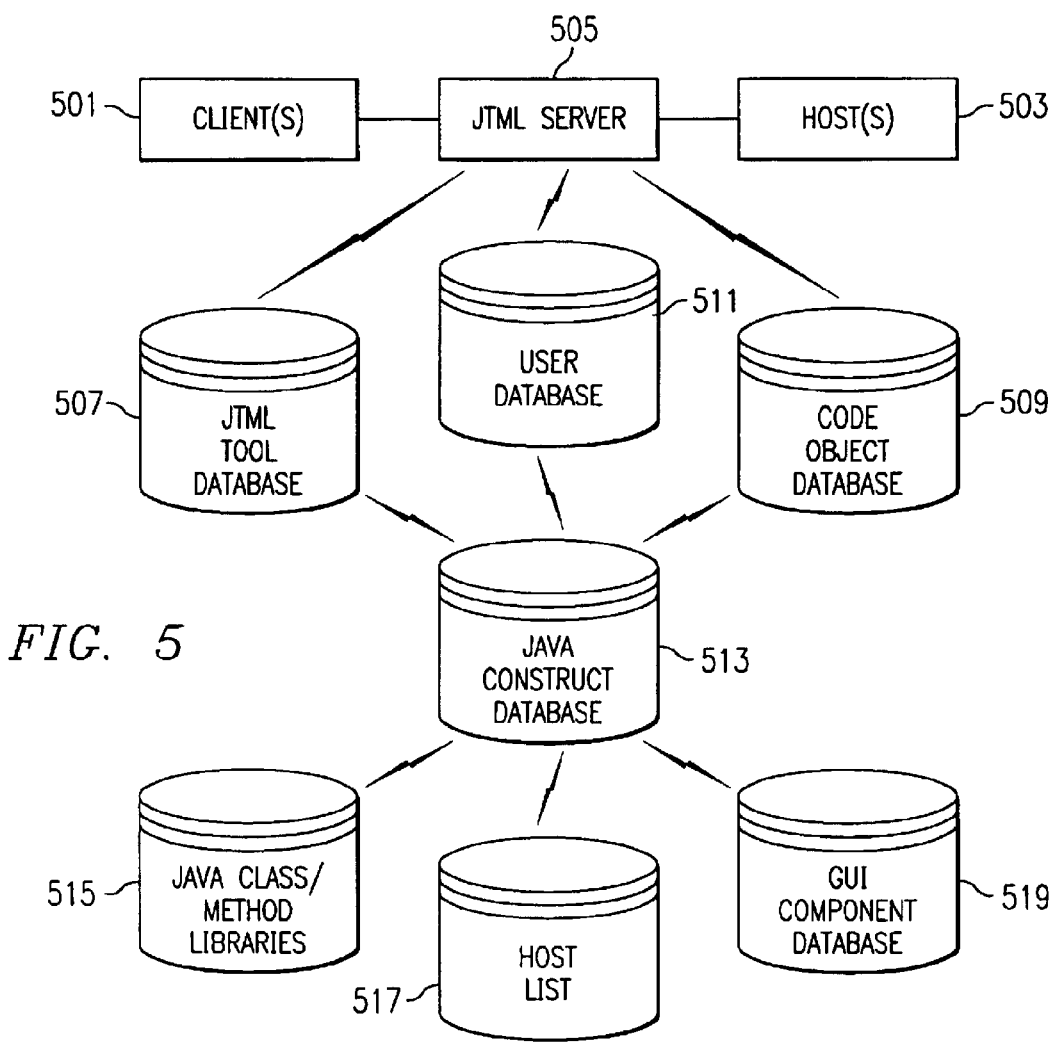
FIG. 5 illustrates a network configuration as shown in FIG. 4 including a relationship diagram of database objects stored in JTML server memory.

FIG. 5 further illustrates the network configuration shown in FIG. 4, including a relationship diagram of database objects stored in a JTML server memory. The network configuration consists of one or more clients 501 connected to JTML server 505, which is further connected to one or more hosts 503. A series of interconnected databases are contained in the memory of JTML server 505. These databases can be accessed by client 501, via JTML server 505.

The present invention allows users a means to rapidly create and deploy new tools. These users may be, for example, network administrators who have a need to rapidly develop and deploy new tools for use on the network but who may not possess advanced programming skills.

In one aspect of the present invention, an administrator need only identify a tool by its unique name to execute the tool. However, the tool resides on JTML server 505 rather than client server 501 or host server 503. Thus the tool creation code is kept apart form the user/administrator. In fact, in the present invention the user creates a tool using a simple JTML language interface. The user provides the JTML server with JTML pseudo code or code objects which the JTML server recognizes and performs routine programming tasks associated with the JTML code objects sent from the user. Thus, the JTML server provides the programming expertise need for tool creation and not the user. The JTML server not only builds the executable JTML tool, but also invokes the Java classes necessary to create a JTML graphical user interface necessary for the user to enter data and commands for executing the JTML tool after the tool has been created.

In another aspect of the present invention, the position of JTML server 505 is advantageous over prior art networks. Positioning of JTML server 505 between clients 501 and hosts 503 provides greater security for hosts 503. Because JTML server 505 effectively insulates all hosts 503 from any contact or connection with clients 501, the JTML server acts as a secure port to the host. No code or command passes directly between the host and the client. The JTML server mediates all transactions between the two. The host can be sure that any tool executed from a JTML server was created from a subset of Java class libraries resident on the JTML server. Therefore, there is a high degree of certainty that the classes and methods are valid, non-infectious and compliant, and that the JTML tool created from those Java constructs has been checked for operability, at least at the code object level. Therefore the host may defer security to the JTML server, at least to some degree.

Additional security is afforded by the JTML server logging each user's access and each user transaction. A record is therefore created from all user interaction between the client and the JTML server for review.

A user call initiated from one of clients 501 to JTML server 505 initially accesses one of three interconnected main databases. These databases are JTML tool database 507, which contains lists of uniquely named JTML tools, user database 511, which contains a user list including security, and code object database 509. A user request originating at client 501 may take several forms. For example, the user request may be a request to create a tool. In this case, the request might consist of a series of code objects, which would be accessed from code objects database 509. Code objects for creating a tool might instead be accessed by using a pathname defining the location of the code objects. Alternatively, the user request may consist of a JTML tool by its unique JTML tool name. Then, the requested JTML tool would be retrieved by JTML server 505 accessing JTML tool database 507. In any case, before the JTML server responds to a client request, the user is authorized by accessing the user list in user database 511.

Each of the above mentioned databases are all linked to Java construct database 513, which contains Java constructs related to the code objects. Each Java construct defines the relationship between an individual code object or a code object defining a JTML tool, and the Java classes or methods needed to construct a JTML tool. The construct also defines the GUI components needed for creating the JTML tool interface needed for the user to execute the tool.

Java constructs may also define a list of hosts or host types that the particular code objects or Java tools are compatible with. However, because one aspect of the present invention is the ubiquitous creation of tools, specifying a host type or host list is optional and performed only when the JTML tool may have an adverse affect on noncompliant hosts.

Java construct database 513 is linked through Java class library 515 in order to invoke the Java classes/methods needed to create the JTML tool and JTML tool user interface. Once JTML server 505 recognizes a code object, the JTML server calls up the Java construct related to the code object. This mechanism allows the server to access the Java methods/classes from Java class libraries 515, which are related to that code object. At the same time, JTML Server 505 is able to create the GUI components needed to create a user interface for the user to execute the tool. The GUI component are typically created from invoking the Java classes/methods associated with the Java constraints but may also be available in GUI component database 519.

While JTML Server 505 does not necessarily execute the JTML tool at the time it is created, optionally, the server is able to access from host list database 517 a list of hosts which the JTML tool is in compliance with. This allows the JTML server to check a host for operability and determine if the user is authorized access to that host. The JTML server can return an error to the user if the newly created JTML tool cannot execute on the user's intended execution host or if the user is not authorized. Host list 517 saves valuable host server time by determining in advance of executing the JTML tool on a particular host, potential execution or compliance errors.

Figure 6A:
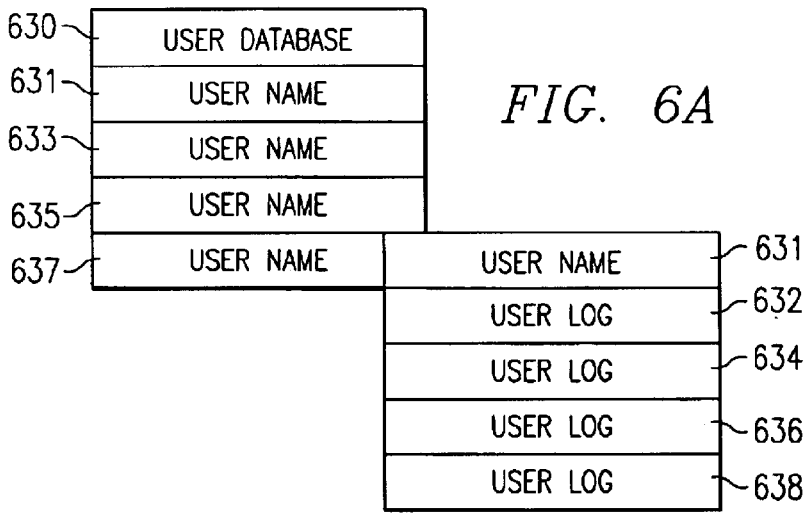
FIG. 6A illustrates a user list contained in JTML server database 511.
Figure 6C:
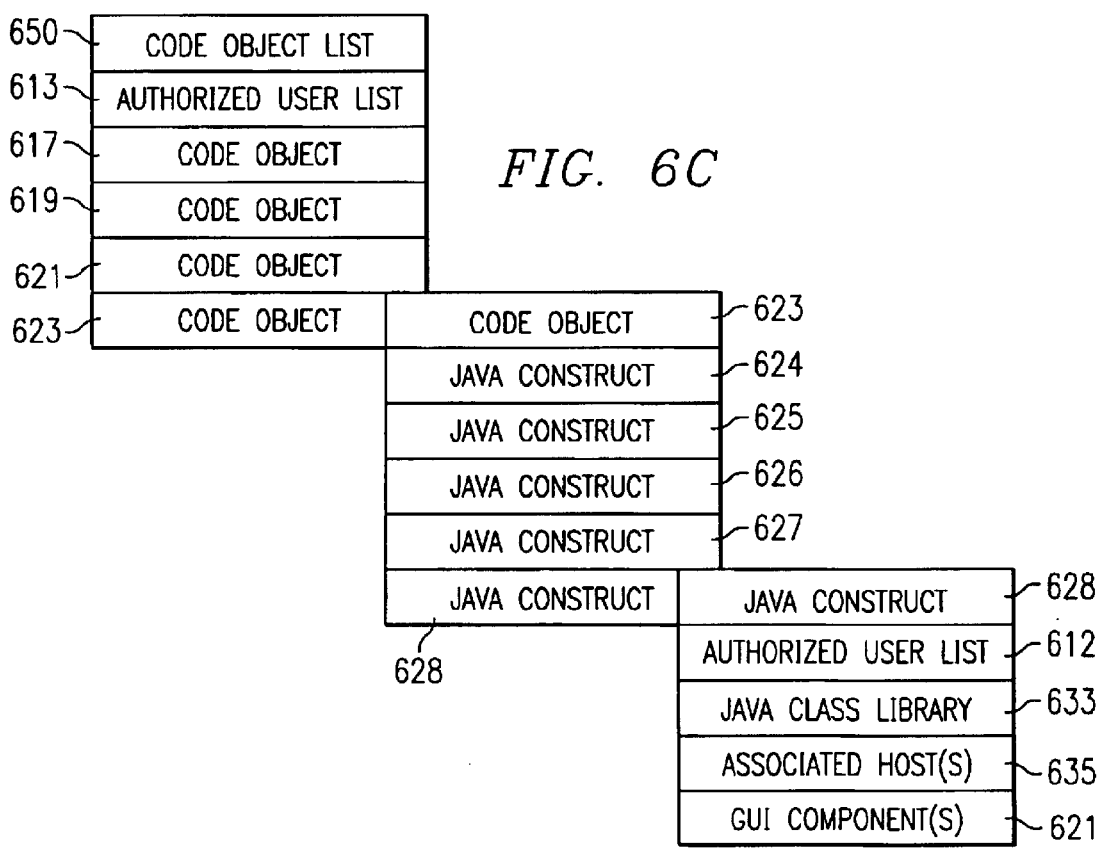
FIG. 6C illustrates a link list as might be resident in Java Code database 509.

FIGS. 6A–6C depict a linked list of entities held in JTML server 505 in a preferred embodiment of the present invention. FIG. 6A illustrates the user list contained in JTML server database 511. In one aspect of the present invention a user list contains user logs which in turn may contain JTML tool pseudo code. A user request directed to JTML file for creating a JTML tool could be accessed by a number of means. First, the requestor provides a pathname to the JTML file. The requester might also requests a list of all users with accounts on JTML server 505. JTML server 505 then accesses user database 630 for user name entries and returns a list of the user names contained in user database 630, in FIG. 6A the entries are user names 631–637.

As discussed above, associated with each user name is a user log generated for each transaction between the user and JTML server 505. This is depicted in a lower level list under the header of user name 631. Under that header is indexed several entries, user logs 632–638. Each time a user is authorized access on JTML server 505 or conducts any transaction on that server, a log is of the transaction is automatically generated. The user log includes pertinent data such as pathname requests, pseudo code JTML tool creation requests and execution results from executing JTML tools on a host.

A user log generated by the JTML server is automatically indexed to the user's name. An important feature of the present invention is the availability of the user logs to be used as a basis for creating new tools, modifying JTML tool and debugging tools once they are created. The users logs also provide valuable information for conducting security checks, ordering tools, updating tools and evaluating the condition and progress of user generated JTML tool creation pseudo code by a particular user.

FIG. 6B illustrates a linked list as might be resident in JTML tool database 507. A user placing a request to execute a specific JTML tool to JTML server 505 would initially request a JTML tool by its unique JTML tool name. However, if the user is unsure of the JTML tool name or desires to peruse a menu of available tools from the server, the user could instead request a list of JTML tool names from JTML server 505. The linked list structure of JTML tool database 507 is similar to the linked list contained in JTML user database 511 in that the structure of each list is composed of a header and a series of entries indexed to that header. Each entry within the list being a header of a next lower level, which may have a series of entries associated with that header. Depending on the depth and complexity of the linked list, the list may proceed for several levels. In the specific example of FIG. 6B, the JTML tool database contains a JTML tool list 601. Entries in the JTML tool list 601 consists of a series of tool names referring to tools which are available to at least some users. Each JTML tool is indexed by its unique tool name. In this case, JTML tool list 601 contains JTML tool names 603–611. Once a user identifies a unique tool to JTML server 505, the server accesses the tool creation code associated with that unique tool name. In this case, JTML tool name 611 has been accessed opening a list which first entry contains an authorized user list 613.

Before the JTML server processes the user's request for the tool, the JTML server checks the user list for the user's name and password. Assuming the user is authorized to use JTML tool 611 the list is expanded to reveal a series of JTML code objects 617–623. While the code objects are referred to as "JTML code objects", the code objects may be any number of different pseudo code statements using any number of markup language syntaxes.

An important aspect of the present invention is that the code objects do not follow the usual rigor associated with conventional programming code, thus do not require the skill necessary to assemble that programming code.

Rather the code objects are abbreviated code statements (pseudo code) which refer to Java constructs which in turn invoke Java classes/methods needed for accomplishing tasks referred to by the code object.

Code object may or may not be revealed to the user. When a user intends to construct or modify a JTML from pseudo, the pseudo code is presented to the user. The user needs the pseudo code in order to modify the JTML tool. However, if a user merely intends to execute a JTML tool, the pseudo is generally not delivered to the user. The user merely enters the JTML unique tool name or the pathname and the JTML tool is constructed by the JTML server behind the scene from the user. In any case, the code objects are the last level of detail readily accessible to the user.

Each code object depicted in FIG. 6B, such as code object 623, is expandable to reveal a series of Java constructs. In order to modify these constructs, a user would need the skill level approaching that of a programmer, so in keeping with the objective of simplifying tool construction for a network or system administrator, Java constructs are kept hidden from the typical user.

In the example of FIG. 6B, code object 623 is composed of five Java constructs 624–628. As discussed above with reference to FIG. 5 each Java construct defines a series of Java methods or classes needed for creating a JTML tool and a JTML tool user interface. The JTML server recognizes a code object and then calls up the Java construct related to the code object. The associated method and classes are then invoked from the Java class library. Eventually of course, every construct associated with each code object in the JTML file is executed in order to create the requested JTML tool and JTML tool interface needed for executing the JTML tool.

In building the tool and GUI interface, the Java constructs refer to other databases and libraries. In this example Java construct 628, is comprised of an authorized user list 612, thereby limiting the users who can actually access this Java construct. Because the JTML code object which refers to the Java construct is likewise secured from unauthorized access, the user field is optional. Authorized user list 613 in JTML tool 611 is merely a list of every user who is authorized to use code objects 617 to 623. However, authorized user list 612 associated with Java construct 628 may contain more users than those allowed to use JTML tool 611. This is due to the fact that one of the other code objects contained in JTML tool 611 may contain a Java construct not authorized for some users listed in authorized user list 612.

Regardless, Java construct 628 also contains a Java class library 633 or a list of libraries containing the classes and methods needed to execute the code object requested by the user. Java construct 628 also contains the associated host 635 in which the code object is intended to be executed on. Maintaining a list of hosts running compliant platforms increases the confidence of error free tool executions. Finally, Java construct 628 contains the GUI components 621 needed for the user to transmit the necessary data to the host in order to execute the requested Java tool.

FIG. 6C illustrates a link list as might be resident in Java code database 509. Here, rather than the user requesting a JTML tool by name, the user may build or modify a JTML tool from a series of code objects or a series of pseudo code statements. In a preferred embodiment the code objects are JTML objects, however, the code objects might be in any form as long as the JTML server can identify the code object for retrieving the associated Java constructs.

JTML server 505 is unable to define the requested JTML tool name in database 507 until the tool actually exists, that is, until a user creates the tool. Therefore, user requests which does not contain a JTML tool name, but instead contains only pseudo code objects, would initially be parsed into individual code objects, checked for syntax and then each valid code object would be used as an entry point on code object database 509.

As was discussed above with respect to FIG. 6b, JTML server 505 initially checks to see that the user's name is on an authorized user list 613. Having done that, JTML server selects code objects from a list of code objects contained in code object list 650. In this case, code object entries are 617 to 623. Again, each code object, such as code object 623 contains a series of Java constructs associated with that code object. Depicted as an example, code object 623 comprises a series of Java constructs, (construct 624 to 628) which define that code object. Each Java construct is further comprised of the data and executables necessary to perform that particular part of the function necessary to execute the requested code object.

Each Java construct defining a code object is linked to data fields needed to execute the Java construct. In the example depicted in FIG. 6B, Java construct 628 is linked through the expanded list to user list 612, for verifying the user's authorized, one or more Java class libraries 633, for indexing Java classes and methods needed related to the code object, host class list 635, for defining compliant hosts or classes of host intended to execute the Java classes defined by the Java construct, and finally, GUI components 621 used alternatively to GUI Java classes for building an interface for the user.

It is important to note that these figures described above are exemplary only and are not intended in any way to limit the invention. Linked lists may be used in order to implement the present invention as linked lists and list pointers are well known in the art. Other well known processes such a sub-classing, used in object orienting programming is an alternative to the linked list approach. One of ordinary skill in the art would realize that other methods are possible and depending on the platform used by the particular embodiment, may have more desirable attributes in that platform environment.

FIGS. 7A and 7B illustrate a preferred embodiment of creating a JTML tool using a JTML server and executing that JTML tool as disclosed in a preferred embodiment of the present invention. Referring to FIG. 7A, the process starts in the JTML server when the server receives and decodes a user ID, user password and a request containing a JTML pathname and/or JTML code objects (pseudo code) from client (step 701). Generally it is assumed that all transactions between the user and the JTML server are encrypted. At this time, JTML server 505 immediately starts a log of the transactions for the user requesting the JTML tool creation even before the user has been authorized (step 703). The ID and password of the user are checked against a list of authorized users (step 705). Note that the user ID and password are checked after the log has started in order to create a record of access attempts by unauthorized users and hackers. Thus, a list can be complied of all unsuccessful authorization attempts. If the ID or password are not authorized by JTML server 505, the failure is logged on the user transaction log and notification is returned to the client (step 707). If however the user is authorized, JTML server 505 then determines whether that user is authorized for each code object contained within the user request or for the code objects obtained from the pathname (step 709). If the user is not authorized for the code objects within the request, the failure is logged and notification is returned to the client (Step 711).

After authorizing the user, the JTML server parses the JTML code objects or JTML pseudo code from the JTML file in the user request (Step 713). The Java constructs related to the individual code objects are then accessed (Step 715). Using the constructs gathered from the pseudo code in step 715, JTML server 505 then accesses the Java class libraries for the Java classes/methods defined by the Java constructs (step 717). JTML server 505 then creates the JTML tool and the JTML GUI components for executing the JTML tool at the client server (step 719). JTML server 505 then sends the JTML GUI created from the JTML GUI components to the client (step 721).

Other preferred embodiments of the present invention are possible. For instance, after a tool has been created by a user, the user identifies the JTML tool with a unique tool name. The newly created and named JTML tool is then stored in JTML tool database 507. Of course, not every user may be authorized to create and store tools and therefore in another aspect of the present invention the user must be authorized to store the tool in JTML tool database.

FIG. 7B illustrates a process executing a tool which may be created by a JTML server. This process illustrates the flow as seen from JTML server 505. Once a JTML tool has been created, JTML server 505 receives and decodes a JTML tool execution command or data from a client (step 722). At this point in the process, a user at a client, such as client 501, has already created or requested a unique JTML tool in order execute that JTML tool on a specific host.

The users enter data or makes specific command requests on a JTML GUI sent to the client from the JTML server. The JTML tool execution command and data refers to the data and commands entered on the JTML graphical user interface. The execution command and data is then transmitted back to JTML server 505. As before, each transaction between JTML server 505 and the user on client 501 is logged on that user's log (step 723). Upon receiving the execution data, JTML server 505 attempts to find the host and establish a connection for the client (step 725). Prior to connecting to the client server, JTML server 505 resolved that the requested JTML tool is available and that the host server intended to execute the tool is compliant with the Java classes used to construct the tool. However, the JTML server must still then attempt to contact that host and make a connection in path for sending the JTML tool and tool execution request.

User requests do not proceed directly from client 501 to any of hosts 503. Instead, the user requests are intercepted by JTML server 505. The only connection established to any host is a connection between the JTML server and that host. A client is never connected to a host. Once a connection is established between JTML server 505 and host server 503, JTML server 505 logs the tool command and data from the client, and transfers them to host 503 (step 727). Though not shown in FIG. 7B, host 503 then executes the JTML tool using data provided by the user and performs the requested JTML tool functions. Once completed, the host transmits the JTML tool execution results to JTML server 505.

At that point, JTML server 505 receives the tool execution results from host 503 and logs the results in the user log (step 729). The JTML server then transmits the execution result to the client 501 (step 731) and logs transmission of the results and any reply from the client in the user logs (step 730). The process then ends.

Figure 8:
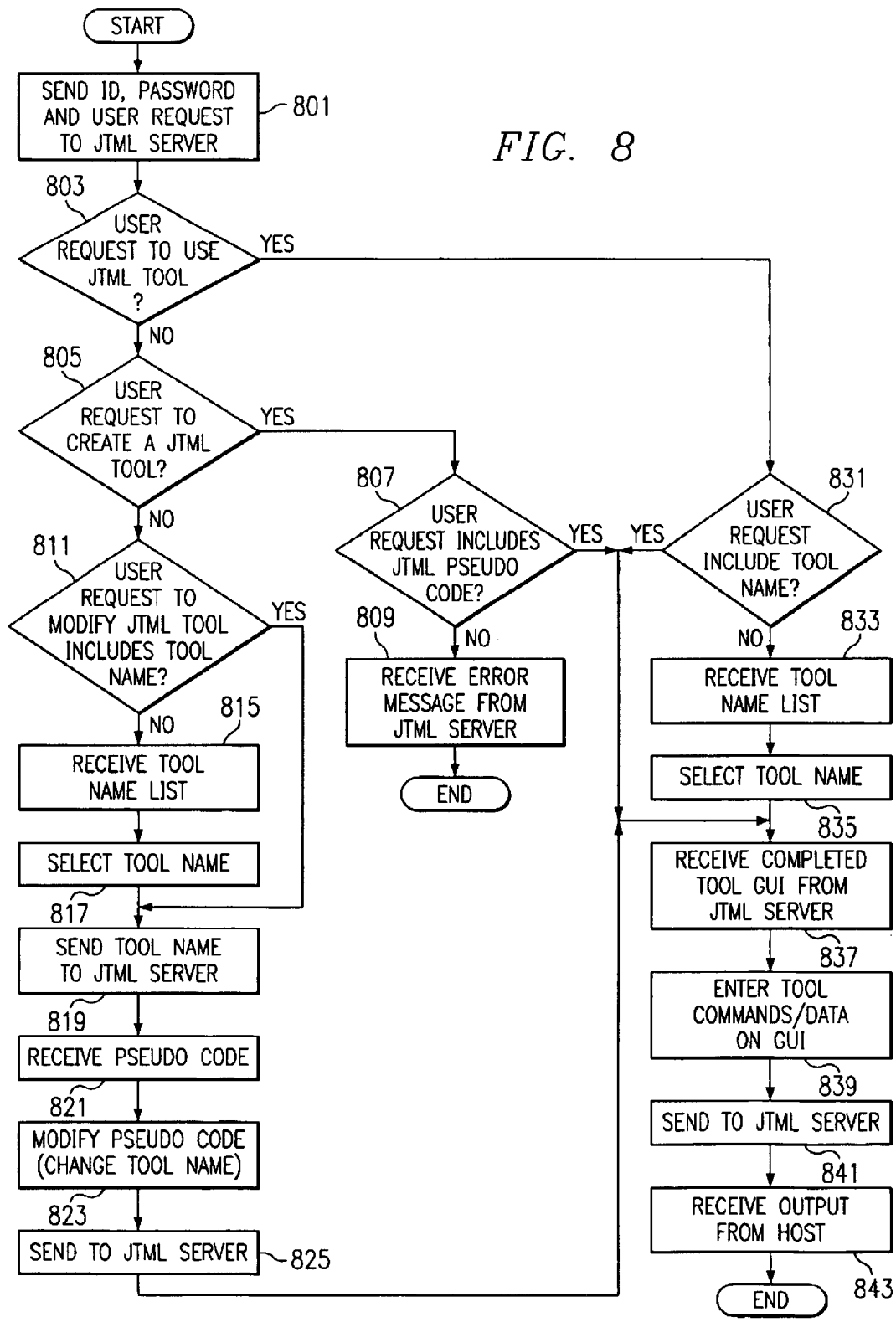
FIG. 8 illustrates a process performed at a client computer of creating or modifying a JTML tool for use on a JTML server.

FIGS. 8A and 8B illustrate the process performed at the client computer of creating or modifying a JTML tool for use on a JTML server. The process starts with the user sending a request, which includes at least user ID and user password. The request also includes some indication as the whether the user intends to execute an existing JTML tool or create (or modify) a new JTML, and a JTML file if needed (step 801). The request to create a JTML tool, modify a JTML tool, or execute a JTML tool must conform to a specific request structure required by the JTML server. The user or user's server must evaluate the request to be sent to a JTML server. The user first must determine if the intent is to execute a JTML tool (step 803). If it is the user's intent to use a tool rather than to create a JTML tool, the process then flows through to step 831 on FIG. 8B.

In FIG. 8B the process continues by determining whether the user request includes a unique tool name (step 831). If the user request appears to include a JTML tool name, the tool name is then validated by the JTML server (not shown). The user will then receive a completed JTML GUI for the requested JTML tool from JTML server (step 837). However, if the user request does not contain a tool name or the tool name is syntactically incorrect, the JTML server cannot identify requested tool. Various alternatives to ending the process are possible such as the JTML sever sending a short list of the most likely tools available on the sever based on the requested tool name. Or, the user may merely request a list of the JTML tools resident on a particular JTML server. In any event, the user receives a list of JTML tolls available on the JTML server (step 833). The user then merely selects the desired JTML tool name (step 835) and includes it in the request. The process then again flows to step 837 where the completed JTML GUI is returned from the JTML server. At that point, the user merely enters commands and data on the JTML GUI (step 839), sends the information to the JTML server (step 841) and finally, after the JTML tool has been executed at the host, the user will receive the output results from the host (step 843). Although the user received JTML tool execution results from the host at step 843, those results do not come directly from the host but rather are routed through the JTML server and then on to the client used by the user.

Turning again to FIG. 8A, if it is not the intent of the user to use a JTML tool, it must then be determined whether the user intends to create a new JTML tool (step 805). If the user's request is directed at creating a new JTML tool, the user's request may include JTML pseudo code or JTML code objects. Alternatively, the request may include a JTML pathname for the JTML code objects. Either of these items could be included in the JTML file.

A check is made for JTML pseudo code within the user's request (the JTML file) (step 807). If the user's request is directed toward the creation of a tool, and yet the request contains no JTML pseudo code or a JTML pathname for recovering the JTML code objects, the user can expect to receive an error message from the JTML server (step 809). However, if on the other hand, the user request does contain pseudo code the process flows again to step 837 in FIG. 8B. The JTML server will then evaluate the JTML pseudo code within the user's request. The user will then receive the completed GUI from the JTML server (step 837). The process continues for executing the tool as discussed above. The user merely enters tool commands and data on the JTML GUI (step 839), sends the information to the JTML server (step 841) and finally, after the JTML tool has been executed at the host, the user will receive the output results from the host (step 843). However, although the user received JTML tool execution results from the host at step 843, those results do not come directly from the host but rather are routed through the JTML server and then on to the client used by the user.

Another important aspect of the present invention is the ability to store and re-use JTML code objects. This greatly simplifies the task of creating new tools and modifying old tools by allowing users the flexibility to use partially completed JTML tools and portions JTML tool code to create entirely new JTML tools. The present invention also lessens the level of skill needed for a user to create Java based tools for executing on a network server by enabling a user to create tools from uncomplicated code objects rather than having to use and understand programming in Java. Users have the option of creating a tool entirely for code objects or instead cloning a prototype JTML tool and modify the prototype JTML tool code to form an entirely new JTML tool. In fact, users have the option of selecting generic JTML tools available from the JTML server specifically for tool creation or selecting sub-tool consisting of JTML tool routines which can be used as a base for creating new JTML tools.

Returning again to FIG. 8A, if the user intends to modify a JTML tool, an indication must be given to the JTML server within the user's request. The user request may or may not contain a JTML tool name (step 811). If the user request contains a JTML tool name, the tool name is sent along with the request to the JTML server (step 819). However, if the user request does not contain a JTML tool name, the user may instead request a list of valid JTML tool names from the JTML server (step 815). The user then merely selects one of the JTML tool names (step 817) and then again sends that tool name to the JTML server (step 819). Once the server receives the tool name and a request for modification, the server then returns a pseudo code which defines the tool name to the user and the user receives that pseudo code (step 821). Alternatively, the user may instead send a JTML pathname and the JTML server will respond with the JTML pseudo code included in the JTML file at that location. The user then may modify the pseudo code and change a tool name to represent the newly created JTML tool (step 823). The user then sends the modified tool and name to the JTML server (step 825).

At that point, the process flows again to step 837 in FIG. 8B. The JTML server will then evaluate the JTML pseudo code within the user's request. The user will then receive the completed GUI from the JTML server (step 837). The process for executing the tool continues as discussed above, the user enters commands and data on the JTML GUI (step 839), sends the information to the JTML server (step 841). After the JTML tool has been executed at the host the user receives the output results from the host (step 843). Although the user has received JTML tool execution results from the host at step 843, those results do not come directly from the host but rather are routed through the JTML server and then on to the client used by the user.

Figure 9A:
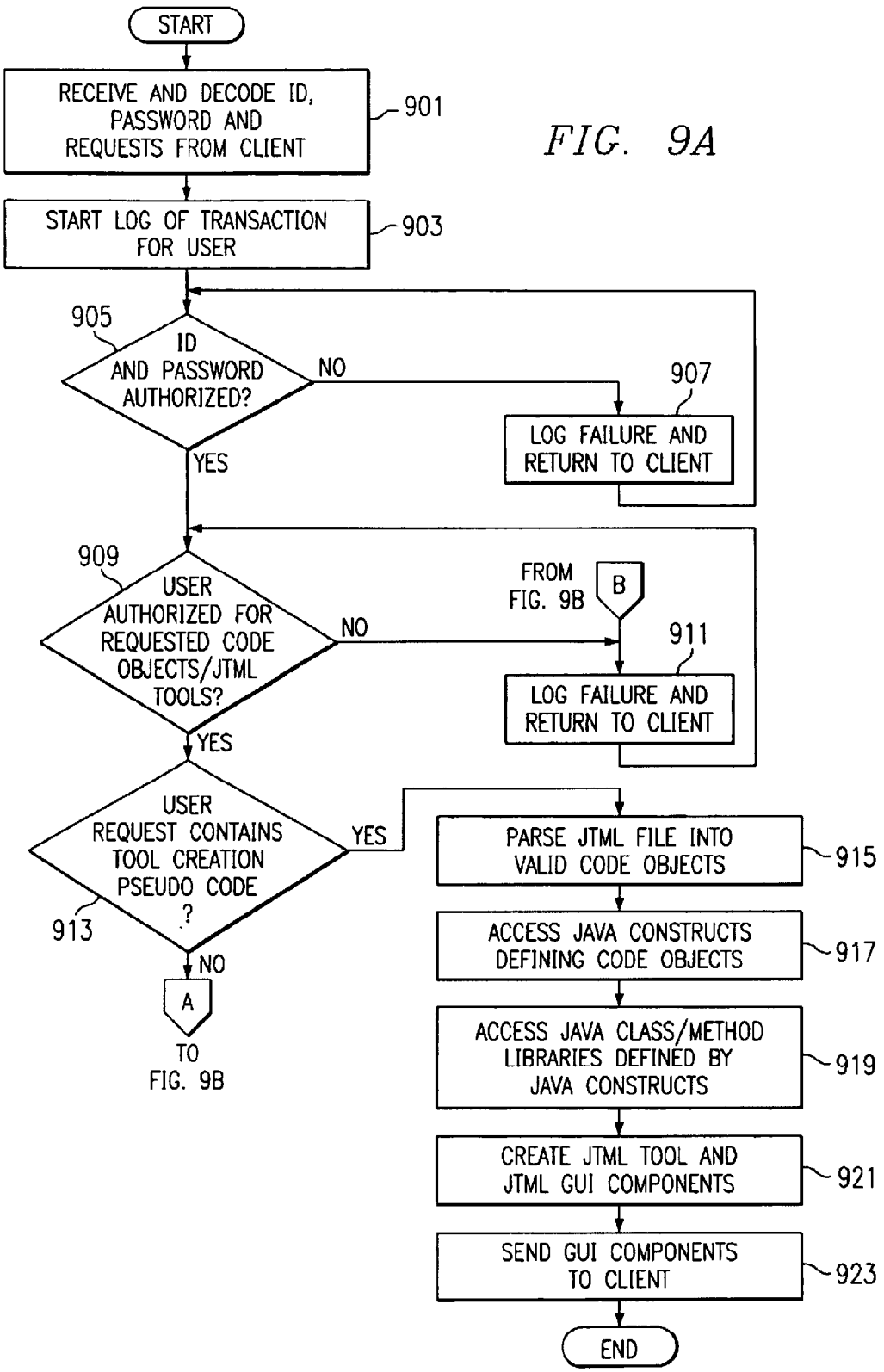

FIGS. 9A and 9B illustrate a more detailed view of the process of the present invention as seen from the JTML server. Initially, the JTML server receives and decodes the user ID, user password, and request from a client (step 901). The request may include JTML pseudo code or code objects in a JTML file, or may include a JTML pathname to a JTML file containing a JTML tool or JTML code objects or might instead merely identify a JTML tool by its unique tool name. The JTML server starts a log of the transactions for the user (step 903). The user then checks the ID and password of the user for authorization (step 905) and returns an error to the client and logs the failure (step 907) if the user is not authorized. The user being authorized, the JTML server then checks to see if the user is authorized for the requested code objects or the code objects contained in the JTML tool (step 909).

Again, if the user is not authorized for one or the other, the failure is logged and returned to the client (step 911). If the user is authorized for the code objects or the JTML tool requested, the JTML server then determines if the user request contains any pseudo code objects (step 914). This step seems redundant but is needed for checking the validity of the JTML file and creating a JTML tool from the JTML pseudo code in the file.

If a JTML file or JTML pseudo code is contained within the request, the JTML server parses the JTML code objects or JTML pseudo code from the JTML file in the user request (step 915). The Java constructs related to the individual code objects are then accessed (step 917). Using the constructs gathered from the pseudo code in step 917, the JTML server then accesses the Java class libraries for the Java classes/methods defined by the Java constructs (step 919). The JTML server then creates the JTML tool and the JTML GUI components for executing the JTML tool at the client server (step 921). The JTML server then sends the JTML GUI created from the JTML GUI components to the client (step 923).

Returning to step 913, if the user request contains no tool creation JTML pseudo code, the process then flows to step 930 in FIG. 9B. In step 930 the determination is made as to whether JTML tool creation pseudo code is available from the user's file. Each user has an account in the JTML server which includes log files from user/server transactions and JTML tools and JTML tool pseudo code. In this aspect of the present invention, the user may identify partially created JTML tools or JTML pseudo code or code statements which are not listed in the JTML tool database 507. This feature of the present invention allows the user to continually test and update tools which have not been completed and also allows users the capability of addressing problems in JTML tools which have failed, are outdated, or have been modified by others. It also allows the user a safe residence for JTML tool code objects which have not been validated by the JTML server or for JTML tools which perform poorly.

If JTML tool creation code is available from the user's file, the user must identify the JTML pseudo code in the user's file (step 932). Again, this can be done with a unique tool name or the JTML pseudo code may be taken from user transaction logs created during the creation or modification of a JTML tool. Once a JTML tool, JTML file or JTML pseudo code has been identified within the user's file, the JTML server again checks that the user is authorized for the JTML code objects which define the JTML tool (step 934). If the user is not listed on authorized user list for the specific code objects, the process flows back to step 911 in FIG. 9A where the failure is logged and failure results are returned to the client.

If the user is authorized for the code objects, the JTML server parses the JTML code objects or JTML pseudo code from the JTML file in the user request (step 950). The Java constructs related to the individual code objects are then accessed (Step 952). Using the constructs gathered from the pseudo code in step 952, the JTML server then accesses the Java class libraries for the Java classes/methods defined by the Java constructs (step 954). The JTML server then creates the JTML tool and the JTML GUI components for executing the JTML tool at the client server (step 956). The JTML server then sends the JTML GUI created from the JTML GUI components to the client (step 958).

Returning again to decision block 930, if the JTML tool creation pseudo code is not available from the user's file it must be determined if the tool creation pseudo code is available from any user's file within the JTML server (step 936). An important aspect of the present invention is that a JTML tool may be created for specific use or for a specific set of users. That JTML tool may not be resident in the general JTML tool database 507. Instead, JTML tools may be created privately for a user's private use or created for groups of users and not made available to the general public's perusal on JTML tool database 507. The ability to keep the creation and/or existence of these JTML tools secret, while allowing access to selected users and administrators, is a problem solved by allowing individual users and administrators to store JTML tools which they have created, modified, or cloned in their own user databases. In the present invention, a user has qualified access to his portion of the user database. The present invention also allows for a user to authorize other users to access selected portions or all of their own database for JTML tools or useful works of JTML pseudo code needed to create or modify new JTML tools.

Returning again to step 936, if JTML tool creation pseudo code is not available from another's file, the process again flows back to step 911 in FIG. 9A and the failure is logged and the failure results are returned to the client. However, if it can be established that the needed JTML pseudo code is available from another's user file, the user requesting the JTML pseudo code must be authorized for access to that file in the other user's database. An inquiry is made by the JTML server checking that the user requesting the information has been authorized access by the owner of that user file (step 938). If the user has not been authorized, the failure is logged and the results are returned again to the client (step 911). If the owner of the file has authorized the user to enter the file, the user again must identify the JTML pseudo code in that file (step 940). JTML server then again checks that the user is authorized for the JTML code objects contained in the file or in the JTML tool (step 942). Again, if the user is not authorized, the failure is logged and the results are returned to the user (step 911). If on the other hand, the user is authorized, the JTML server parses the JTML code objects or JTML pseudo code from the JTML file in the user request (Step 950). The Java constructs related to the individual code objects are then accessed (Step 952). Using the constructs gathered from the pseudo code in step 952, the JTML server then accesses the Java class libraries for the Java classes/methods defined by the Java constructs (step 954). The JTML server then creates the JTML tool and the JTML GUI components for executing the JTML tool at the client server (step 956). The JTML server then sends the JTML GUI created from the JTML GUI components to the client (step 958).

The present invention allows users who do not possess advance programming skills a means to rapidly create and deploy new tools. Such users include network administrators who need rapid tool develop for use on their networks, and yet usually cannot create the tool from programming code. Administrators may also administer several different network platforms requiring skill in many different programming platforms. Using the present invention a user need not be proficient in any conventional programming languages. The user creates tools using a simple JTML language interface. The user provides the JTML server with JTML pseudo code or code objects which the JTML server recognizes and performs routine programming tasks associated with the JTML code objects sent from the user. Thus, the JTML server provides the programming expertise and not the user. The JTML server not only builds the executable JTML tool but also invokes the Java classes necessary to create a JTML graphical user interface necessary for the user to enter data and command for executing the JTML tool once the tool has been created. Subsequent to creating the JTML tool, the tool is executed by the user merely requesting a tool from the JTML server by the tool's unique name. The tool resides on JTML server 505 rather than client server 501 or host server 503. Thus the tool code is kept apart form the user/administrator.

In another preferred embodiment of the present invention, the JTML server 505 positioned between the user's client server 501 and host server 503. This configuration provides a greater level of security to a host when creating and executing software tools than has been known in the prior art. Because JTML server 505 effectively insulates all host(s) 503 from any contact or connection with client(s) 501, the JTML server acts as a secure port to the host. No code or tool commands pass directly between the host and the client. The JTML server mediates all transactions between the two. The host can be sure that any tool executed from a JTML server were created from a subset of Java class libraries resident on the JTML server. Therefore, there is a high degree of certainty that the classes and methods are valid, non-infectious and compliant and that the JTML tool created from those Java constructs have been checked for operability, at least at the code object level. Therefore a host may defer security to the JTML server, at least to some degree.

The JTML server provides additional security by logging each user's access and every transaction. The record created from all user interactions between the client and the JTML server is then available for analysis.

Another aspect of the present invention is that the JTML server expedites mobile computing by the user. Prior to the present invention, the host authorized both the client and the user before allowing tool execution transactions. In the present invention the user access port is at the JTML server and not the host server. The host authorizes the JTML server rather than the client server. Therefore the location of the client is no longer important to the host. Clearly, the host or the JTML server could be configured to authorize only selected clients or client locations. However a preferred embodiment of the present invention neither the location nor address of the client is a security consideration to the host because all host transactions are ported through a secure JTML server. Therefore user has the option of creating tools on JTML servers from different client locations or addresses. With the present invention a user creates and executes tools from different locations and diverse computer systems within the work place, home, another network or even from the Internet. The JTML server provides a security interface which is more effective than a conventional firewall architectures because no data is directly passed between the server and the host.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, CD-ROMs, and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing implemented method for constructing a software tool, the method comprising:
    receiving a user request from a user for defining a software tool;
    processing the user request to identify at least one pseudo code object, wherein the step of processing includes parsing the user request for code objects;
    retrieving at least one programming task associated with a code object based on identifying the at least one pseudo code object; and
    constructing the software tool from the at least one programming task.

2. The method recited in claim 1, wherein a programming task comprises:
    retrieving user interface components associated with the programming task; and
    constructing a user interface from the user interface components.

3. The method recited in claim 2 further comprising:
    transferring the user interface to a client used by the user.

4. A method recited in claim 1 further comprising:
    chocking the at least one pseudo code object for validity.

5. A method recited in claim 1 further comprising:
    invoking the software tool.

6. A method recited in claim 1, wherein the step of retrieving at least one programming task further comprising:
    associating language construct for at least one code object; and
    on the basis of the language construct, assembling program code.

7. A method recited in claim 6, wherein the language construct is supported by Java.

8. A method recited in claim 1, wherein the step of processing includes retrieving code objects from a pathname in the user request.

9. A method recited in claim 1, wherein the step of constructing the software tool from the at least one programming task further comprising:
    assembling programming tasks associated with each code object in the user request.

10. A data processing system implemented method for constructing a software tool, the method comprising:
    receiving a code object file from a client server;
    parsing the code object file;
    processing the code object file to identify at least one code object;
    retrieving at least one programming task associated with the at least one code object; and
    constructing the software tool from the at least one programming task.

11. The method of claim 10 further comprising:
    executing the software tool on a host server.

12. The method of claim 11 further comprising:
    logging transactions between a computer system and the host server or the client server.

13. A computer-implemented data processing system for constructing a software tool, the system comprising:
    receiving means for receiving a user request from a user for defining a software tool;
    processing means for processing the user request to identify at least one pseudo code object, wherein the processing means includes parsing the user request for code objects;
    retrieving means for retrieving at least one programming task associated with a code object based on identifying the at least one pseudo code object; and
    constructing means for constructing the software tool from the at least one programming task.

14. The system recited in claim 13, wherein a programming task comprises:
    retrieving user interface components associated with the programming task; and
    constructing a user interface from the user interface components.

15. The system recited in claim 14 further comprising:
    transferring means for transferring the user interface to a client used by the user.

16. A system recited in claim 13 further comprising:
    checking means for checking the at least one pseudo code object for validity.

17. A system recited in claim 13, further comprising:
    invoking the software tool.

18. A system recited in claim 13, wherein the retrieving means for retrieving at least one programming task further comprising:
    associating means for associating language construct for at least one code object; and
    assembling means for assembling program code on the basis of the language construct.

19. A system recited in claim 18, wherein the language construct is supported by Java.

20. A system recited in claim 13, wherein the processing means includes retrieving code objects from a pathname in the user request.

21. A system recited in claim 13, the constructing means for constructing the software tool from the programming task further comprising:
    assembling means for assembling programming tasks associated with each code object in the user request.

22. A data processing system for constructing a software tool, the system comprising:
    receiving means for receiving a code object file from a client server;
    processing means for processing the code object file to identify at least one code object, wherein the processing means includes parsing the code object file;
    retrieving means for retrieving at least one programming task associated with the at least one code object; and
    constructing means for constructing the software tool with the at least one programming task.

23. The system of claim 22, further comprising:
    executing the software tool on a host server means for executing.

24. The system of claim 23, further comprising:
    logging means for logging transactions between a computer system and the host server or the client server.

25. A computer program product for performing a method for constructing a software tool, the computer program product embodied on a computer readable memory and comprising a series of instructions, the computer program product comprising:
- receiving instructions for receiving a user request from a user for defining a software tool;
- processing instructions for processing the user request to identify at least one pseudo code object, wherein the processing instructions include parsing the user request for code objects;
- retrieving instructions for retrieving at least one programming task associated with a code object based on identifying the at least one pseudo code object; and
- constructing instructions for constructing the software tool from the at least one programming task.

26. A method in a data processing system for creating a software tool, the method comprising the data processing system implemented steps of:
- receiving a user request for defining the software tool, wherein the user request includes a pseudo code object;
- parsing the pseudo code object into a code object;
- identifying at least one programming task associated with the code object; and
- constructing the software tool using each programming task identified and associated with the code object.

27. The method claim 26, wherein the at least one programming task is a Java class.

* * * * *

UNITED STATES PATENT AND TRADEMARK OFFICE
CERTIFICATE OF CORRECTION

PATENT NO. : 6,748,580 B1  
APPLICATION NO. : 09/296874  
DATED : June 8, 2004  
INVENTOR(S) : Sur et al.

It is certified that error appears in the above-identified patent and that said Letters Patent is hereby corrected as shown below:

Col. 17, line 29: before "the at least one" delete "chocking" insert --checking--.

Col. 18, lines 55-56: delete "executing the software tool on a host server means for executing." and insert --executing means for executing the software tool on a host server.--.

Signed and Sealed this

Twentieth Day of March, 2007

JON W. DUDAS  
*Director of the United States Patent and Trademark Office*